US012655887B2

(12) United States Patent
Wirtz et al.

(10) Patent No.: US 12,655,887 B2
(45) Date of Patent: Jun. 16, 2026

(54) CHAIN

(71) Applicant: J.D. Theile GmbH & Co. KG, Schwerte (DE)

(72) Inventors: Jörg Wirtz, Schwerte (DE); Bernd Müer, Schwerte (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 297 days.

(21) Appl. No.: 18/515,810

(22) Filed: Nov. 21, 2023

(65) Prior Publication Data

US 2024/0167538 A1 May 23, 2024

(30) Foreign Application Priority Data

Nov. 22, 2022 (DE) ..................... 20 2022 106 514.4

(51) Int. Cl.
*F16G 15/12* (2006.01)
(52) U.S. Cl.
CPC .................................... *F16G 15/12* (2013.01)
(58) Field of Classification Search
CPC ........ B65G 19/20; B65G 17/00; B65G 17/38; B65G 17/40; B65G 17/30; F16G 13/00;
(Continued)

(56) References Cited

U.S. PATENT DOCUMENTS 3,410,085 A * 11/1968 Sheth ...................... F16G 13/12
59/84
5,435,434 A * 7/1995 Tekathen ............... B65G 19/24
198/733
(Continued)

FOREIGN PATENT DOCUMENTS

DE        2247300 A1    3/1974
DE        4124788 A1    1/1993
(Continued)

OTHER PUBLICATIONS

Pending U.S. Appl. No. 18/360,314, filed Jul. 27, 2023, inventors Foitzik et al.
(Continued)

*Primary Examiner* — Bobby Yeonjin Kim
(74) *Attorney, Agent, or Firm* — Polson Intellectual Property Law P.C.; Margaret Polson; Christopher Sylvain

(57) ABSTRACT
A chain having a horizontal chain link and a vertical chain link linked in the horizontal chain link. The chain links each having two legs and two opposite bows connecting the legs to one another, such that the links each form self-contained courses. The horizontal link has a functional section on at least one bow designed, on the one hand, in a blocking plane such that the functional section cannot plunge through the vertical link arranged in a first orientation relative to the horizontal link, and, on the other hand, with a width that is narrower than the inner width of the vertical link such that that functional section can plunge through the vertical link arranged in a second orientation relative to the horizontal link. The horizontal link has an inner support section in the inward-facing apex bow region and, on the functional section, provides an outer support path leading around the course of the horizontal link for supporting the vertical link.

13 Claims, 5 Drawing Sheets

(58) Field of Classification Search
CPC .......... F16G 13/02; F16G 13/12; F16G 13/18;
F16G 15/12
See application file for complete search history.

(56) References Cited

U.S. PATENT DOCUMENTS

| | | | | |
|---|---|---|---|---|
| 6,062,374 | A * | 5/2000 | Meya | B65G 19/20 |
| | | | | 198/733 |
| 6,679,648 | B2 | 1/2004 | Benecke | |
| 7,065,952 | B2 | 6/2006 | Benecke | |
| 7,231,759 | B2 | 6/2007 | Benecke | |
| 9,051,993 | B2 | 6/2015 | Benecke | |
| 10,710,846 | B2 | 7/2020 | Redder | |
| 2011/0127146 | A1 * | 6/2011 | Meya | F16G 13/12 |
| | | | | 198/850 |
| 2011/0272253 | A1 | 11/2011 | Document | |
| 2012/0065012 | A1 | 3/2012 | Klabisch et al. | |
| 2015/0020496 | A1 * | 1/2015 | Benecke | B65G 19/20 |
| | | | | 59/84 |
| 2021/0114844 | A1 | 4/2021 | Foitzik | |
| 2023/0202805 | A1 | 6/2023 | Document | |

FOREIGN PATENT DOCUMENTS

| | | | |
|---|---|---|---|
| DE | 19610933 | A1 | 3/1997 |
| DE | 19610935 | A1 | 3/1997 |
| DE | 19831994 | A1 | 1/2000 |
| DE | 102010061264 | A1 | 6/2012 |

OTHER PUBLICATIONS

Pending U.S. Appl. No. 18/450,090, filed Aug. 15, 2023, inventors Foitzik et al.
Pending U.S. Appl. No. 18/483,778, filed Oct. 10, 2023, inventors Wirtz et al.
Pending U.S. Appl. No. 18/484,698, filed Oct. 11, 2023, inventors Fröse et al.
Pending U.S. Appl. No. 18/516,114, filed Nov. 21, 2023, inventors Kresic et al.
Search report dated Apr. 12, 2024 in related European application No. EP 23209955.6.
Extract of German technical standard DIN22252 (Jul. 2012).
EPO Office Action dated Feb. 4, 2026 in related European application No. EP 23209955.6.

* cited by examiner

CHAIN

RELATED APPLICATION

This application claims priority to German application DE 202022106514.4 filed Nov. 22, 2022, which is fully incorporated-by-reference herein.

BACKGROUND

A chain comprises a large number of chain links that are linked together. The chain links have two opposite legs and bows connecting the two legs, so that a closed course is formed by each chain link.

A chain is usable for a variety of applications. Chains can be subjected to pulling and are used, for example, to secure objects or are used as a drive in a conveyor. Two parallel chains are usually arranged in a conveyor, wherein webs are provided between the two chains, which push and thus move a material lying on a path, for example a conveyor trough. Chains used here are endless chains; the chains are redirected at the ends of the path.

It is problematic if no tensile force is applied to the chain or a chain part, for example during storage or in the chain strand. The chain links can then plunge one into another. It is possible for a chain link to slide along the leg of another chain link, so that one chain link contacts the other chain link not in the area of its bow, but in the area of its leg. This can result in a seizing kink arrangement in which the two chain links transmit loads in an unintended arrangement. On the other hand, an intended arrangement—the pulling arrangement—occurs when the two bows of the chain links interlock in order to ensure an intended introduction of tensile force into the respective chain links.

To introduce the tensile force into a chain, chain wheels are usually used, which are subjected to torque. A chain wheel has chain pockets that are complementary to the chain links, in which a single chain link is inserted and in which the chain link is held in a form-fitting manner in the pulling direction. Due to the rotational movement of the chain wheel, the chain link held in the chain pocket is moved along the circumference of the chain wheel and the chain as a whole is subjected to pulling.

In order to be able to transmit the greatest possible tensile force via a chain, the individual chain links are designed to be as solid as possible and have corresponding nominal thicknesses for this purpose. It has been shown that chains having alternately arranged horizontal and vertical chain links, which are aligned essentially perpendicular to one another in accordance with their designation, are particularly suitable for absorbing large forces.

In order to provide a high-performance and at the same time lightweight chain, as much force-absorbing material as possible has to be provided in a small space with respect to one chain link. For this purpose, it is necessary to design the inner width of the respective chain as just wide enough that the height of the chain link engaging in the chain link fits therein, so that the width of a chain link is as small as possible.

However, there is usually a problem when introducing the forces from the chain pocket of the chain wheel into the respective chain link (usually the horizontal chain link): The compressive force can only be introduced into the horizontal chain link laterally to the engaging vertical chain link. Therefore there is usually little room for introducing the forces. In addition, the chain link usually has an arc in this area, so that a force applied in the leg longitudinal extension direction is always only partially introduced in the leg longitudinal extension direction due to the oblique introduction inherent to the arc; the other part is transmitted as thrust force.

It is to be noted that even if it is assumed in this context that the force is transmitted from the chain wheel to the horizontal chain link, the scope of the present disclosure is not limited thereto. It is also not relevant for the following explanations whether the horizontal chain link is arranged horizontally and the vertical chain link is arranged vertically; exchanging the orientations is easily conceivable. The terms are only used for better comprehensibility.

In order to keep the surface pressure low when forces are introduced from the chain pocket into the chain link, so-called arrow-tooth chains have been developed. Such chain links are disclosed in DE 19610935 A1, for example. The goal of the arrow-tooth chains is to design the shear surfaces for force introduction as a line contact instead of as a point contact, as would normally be the case with round arches. For this purpose, the horizontal chain link has functional sections that thicken the bow and are shaped like an arrow.

US 2011/0272253 A1 and US 2011/0127146 A1 disclose a refinement in this regard. Here the functional sections are no longer arrow-shaped, but aligned orthogonally to the legs of the chain link.

The mentioned configurations of the chain links share the feature that they have functional sections following the extension of the legs of the correspondingly designed horizontal chain link. These functional sections are designed in one plane so that they cannot penetrate through the engaging vertical chain link arranged in a specific orientation. This plane that blocks plunging in is hereinafter referred to as the blocking plane. The functional sections in this blocking plane are somewhat thicker than the inner width of the vertical chain link. It can also be provided that the local thickness in the functional section is not increased, but that the vertical chain link is still blocked by adjacent material. The functional sections are arranged in the area of the bow in relation to the leg longitudinal extension; they thus adjoin the part of the leg facing toward the bow.

On the other hand, the functional sections are designed so that they can penetrate through the vertical chain link in a second orientation; for this purpose, the functional section has a width that is narrower than the inner width of the second chain link. In the disclosures mentioned, the width mentioned lies in the height direction of the horizontal chain link. In this way, the vertical chain link can be pivoted relative to the horizontal chain link in the plane spanned by the width and pitch of the horizontal chain link; however, if the vertical chain link is tilted in relation to this plane, the blocking plane of the functional section blocks complete sliding along the course of the horizontal chain link.

In order to prevent the vertical chain link from plunging into the horizontal chain link in an unintended arrangement and thus being twisted around the course of the horizontal chain link—and sliding back through the functional section is then prevented—the chains disclosed have a kink protection, formed by outward-pointing noses, which artificially increase the diameter of the legs of the horizontal chain link so much that their diameter is larger than the inner width of the vertical chain link. In this way, a stop is provided which prevents the vertical chain link from being able to be twisted around the course of the horizontal chain link and plunging into the horizontal chain link, provoking a kink arrangement.

The disadvantage of these designs is that the chain links are relatively heavy due to the additional material required for the artificial thickening of the legs. Against this background, it is typically provided that the legs are thickened only in sections. However, this implies more or less sharp-edged pockets in which dirt or—especially when the chain is used in a conveyor—conveyed material settles. This material usually results in significantly increased wear on the chain wheel and the chain pockets.

DE 2247300 A discloses a chain link with widened thrust surfaces which protrude in a nose shape over the outside of the legs. In order to counteract a kink situation, it is provided here that the engaging chain link is guided in the pulling position.

This has the disadvantage that it is not possible to shift the chain links among themselves in the pulling plane, which is now standard practice.

The foregoing examples of related art and limitations therewith are intended to be illustrative and not exclusive. Other limitations will become apparent to those skilled in the art upon a reading of the specification and a study of the drawings.

SUMMARY

The following embodiments and aspects thereof are described and depicted in conjunction with systems, tools, and methods which are meant to be illustrative and not limiting in scope. In various embodiments, one or more problems have been reduced or eliminated, while other embodiments are directed to other improvements.

Proceeding from this background, one aspect of the present disclosure is to refine chains of the type described above in such a way that they can be made lighter and free mobility is ensured.

Such a chain may comprise a horizontal chain link and a vertical chain link linked in the horizontal chain link, the chain links each having two legs and two opposite bows connecting the legs to one another, such that the chain links each form self-contained courses, wherein the horizontal chain link has a functional section on at least one bow in an extension of the extension of the leg, wherein the functional section is designed, on the one hand, in a blocking plane such that the functional section cannot plunge through the vertical chain link in a kink arrangement arranged in a first orientation relative to the horizontal chain link, and, on the other hand, the functional section has a width that is narrower than the inner width of the vertical chain link such that that functional section can plunge through the vertical chain link arranged in a second orientation relative to the horizontal chain link, wherein the horizontal chain link has an inner support section in the inward-facing apex region of the bow and, on the functional section, provides an outer support path leading around the course of the horizontal chain link for supporting the vertical chain link, along which support path the vertical chain link can slide at least in sections from the kink arrangement by rotating around the course of the horizontal chain link into its pulling arrange-ment, and which support path is inclined in the support path direction by at least 90°+arctan (μ) in relation to the direc-tion of the leg longitudinal extension starting from the functional section, where μ is the coefficient of friction of the two chain links in the area of the support path, such that the vertical chain link independently rotates away from the kink arrangement around the horizontal chain link so that the vertical chain link aligns with the direction of the inner width of the vertical chain link parallel to the direction of the width of the functional section, whereby the functional section plunges through the vertical chain link and the vertical chain link reaches the pulling arrangement.

In a departure from the cited prior art, it is proposed that a kink arrangement be allowed and the functional section of the horizontal chain link be designed in such a way that the vertical chain link can unkink itself from the kink arrange-ment by rotating out of the kink position, surrounding the leg of the horizontal chain link, independently so that it can slide over the functional section. Additional measures, such as artificially thickening the legs to prevent the vertical chain link from plunging into the horizontal chain link, are there-fore no longer necessary.

In order to enable an independent rotation of the vertical chain link around the course of the horizontal chain link, according to a first solution, it is provided that the vertical chain link is supported in the kink arrangement on the one hand on a support section within the bow of the horizontal chain link and on the other hand a support path is provided which—adapted to the vertical chain link—is inclined in the support path direction by at least 90°+arctan (μ) with respect to the leg longitudinal extension direction starting from the functional section, wherein μ is the coefficient of friction of the two chain links in the area of the support path. By providing an inclined support path, the inclination of which is defined as described above, the self-locking of the vertical chain link relative to the horizontal chain link caused by static friction is overcome; the downhill force pointing in the support path direction is then greater than the static friction prevailing between the two chain links. The coefficient of friction of standard steel chain links is approximately 0.10 to 0.15; this accordingly results in an angle of inclination of approximately 7°. This ensures that the vertical chain link is supported in such a way that it automatically unscrews itself along the course of the horizontal link during unkinking.

While the support section in the area of the bow—depending on the design of the chain links—represents a larger or smaller rotation range of the vertical chain link, the outside support path extends along the outer circumference of the horizontal chain link and thus leads around the course of the horizontal chain link, for example, by an angle of up to 50°.

The fact is thus utilized that, depending on the orientation of the vertical chain link to the horizontal chain link, the vertical chain link has a different width provided in the blocking plane direction of the functional section. If the inner width is in the blocking plane, the width provided is only the inner width. If the vertical chain link is pivoted around the course of the horizontal chain link, the width provided increases up to a maximum of the usable pitch.

Inherently, the horizontal chain link can only provide support up to a certain angle of rotation, since otherwise the functional section could not plunge through the vertical chain link. Due to the increase of the available width in the vertical chain link during the rotation on the one hand, and the limited support distance between the support path and the support area on the part of the horizontal chain link on the other hand, the vertical chain link performs a pitching movement during the rotation, thus a tilting movement around its width axis.

This pitching movement is overlaid with a rolling move-ment of the vertical chain link around its pitch axis: while the support path is inclined in the support path direction, the support section usually does not change its height or does not change it significantly. This reduces the available width of the vertical chain link. The strength of the inclination of the support path can therefore additionally influence the angle of rotation up to which the vertical chain link is supported on the horizontal chain link: a greater tilt of the vertical chain link reduces the available width.

Preferably, it is provided that the vertical chain link, while it rotates from the kink arrangement into its intended arrangement, is supported on the horizontal chain link in the leg longitudinal extension direction only on the support section and on the support path. The leg inside of the horizontal chain link can also be part of the support section. In this way, a two-point support is provided in the leg longitudinal extension direction, so that it is ensured that the vertical chain link can slide freely along the horizontal chain link.

In principle, it can be provided that the support path does not have the inclination required to avoid self-locking over its entire extension. There may be sections that have a lower slope. Nevertheless, the teaching of the disclosure can also be implementable if the rotation of the vertical chain link around the course of the horizontal chain link has already been initiated by a section of the support path that has the minimum required inclination and as a result the vertical chain link already has a certain rotational velocity. Then a section of the support path that has a lower inclination than the minimum required inclination can be overcome by the inertia of the vertical chain link.

It is preferably provided that the support path is kink-free. This does not necessarily mean that it has to be continuous, although this is preferred. In the context of the disclosure, kink-free means that the inclination of the support path does not change abruptly. An abrupt change in inclination is observable in a design in which there would be an abrupt contact change between the horizontal chain link and the vertical chain link. This is undesirable because there would always be a point load at this point, which could result in abrasion of material. A continuous support path also ensures a uniform unkinking process.

For unkinking, according to a second solution—alternatively or also additionally to the first solution described above—it can be provided that the functional section is provided with at least one guide surface facing toward the leg. The guide surface opens between the legs of the kinked vertical link and is used to guide the vertical chain link in the horizontal chain link height direction, or to rotate the vertical chain link, so that the functional section for unkinking the vertical link can automatically plunge through it. The functional section is threaded through the inclined guide surfaces through the inner width of the vertical chain link in a self-centering manner.

In order to enable independent sliding along the guide surface and thus a rotation of the vertical chain link around the course of the horizontal chain link, it is provided that the at least one guide surface on the side of the horizontal chain link is inclined in the guide direction by at least $90°+\arctan(\mu)$ in relation to the direction of the leg longitudinal extension starting from the functional section, wherein $\mu$ is the coefficient of friction of the two chain links in the area of the support path. This overcomes the self-locking between vertical link and horizontal link.

It is preferably provided that two guide surfaces are provided per functional section, which enable the vertical link to be guided on both sides. This provides an unkinking geometry that is independent of the direction of rotation of the vertical chain link.

A combination of providing a support path described above and the guide surfaces described is also possible and preferably provided. Thus, with regard to a first section of the rotation of the vertical chain link, it can be provided that it is supported on the horizontal chain link along a support path leading around the course of the horizontal chain link and, when the inner width of the vertical chain link is above the orifice of the guide surface, it is guided further via the guide surfaces.

It is usually provided that, from a kink arrangement in which the vertical link is aligned with its pitch direction orthogonal to the width direction of the horizontal link, in the first 30-50°, preferably 35-45°, the vertical link is supported via the support path and then is guided by means of guide surfaces over the functional section so that the vertical link enters the pulling arrangement.

To form the support path, the functional section can be designed as a nose in its section facing toward the leg, the bridge of which preferably lies in the blocking plane of the functional section. Starting from the nose bridge, the support path is provided along at least one nose wing in a first section. In the kink arrangement, the vertical chain link is then supported on the outside on the horizontal chain link in the area of the nose base formed in the transition from the leg to the functional section. To form the nose base, it can also be provided that the cross section of the horizontal chain link is preferably formed rounded and concave relative to the outer width of the functional section and the leg. The nose base is usually arranged eccentrically to the leg, for example, offset in the leg longitudinal extension direction from the support section in the direction of the bow.

The nose wings can also be designed as guide surfaces in a second section, which is usually farther away from the legs than the above-mentioned first section.

The horizontal chain link is preferably designed symmetrically in the height direction, so that starting from the nose bridge along both nose wings, a support path is provided in each case, the courses of which each lead around the course of the first chain link. In this way, the vertical chain link can be deflected in both directions of rotation.

It is preferably provided that the nose wings, starting from the nose bridge, are initially set at only a small angle relative to the height direction in a first part in their course in the height direction of the horizontal chain link and then merge in a second part into a radius in the width direction of the horizontal chain link. The first part of the nose wing is usually set at approximately 5°, preferably at least 6° to 10°, relative to the height direction of the horizontal chain link. The first part of the nose wing can also be shaped as a radius which is approximately at least 3, preferably 4, times larger than the radius in the second part. The two areas of the nose wing mentioned are preferably approximately the same width in the height direction.

It is furthermore preferably provided that the second area is smaller in the height direction than the first area. In this way, the functional section has a type of rib, due to which the support distance is greatest in the range between 40° and 50° from the blocking plane of the functional section. In this way, the vertical chain link is supported over a large angular amount during its rotation around the course of the horizontal chain link in such a way that, starting from a kink arrangement, it remains oriented having its pitch direction transverse to the course of the horizontal chain link in order to be able to guide it in this orientation over the functional section enough that the functional section can plunge through the vertical chain link.

It is preferably provided that the functional section is completely rounded. This means that it has no edges or corners, but can certainly have straight surfaces. At critical points, i.e., points at which the vertical chain link could be blocked during unkinking, for example by additional support, it is provided that the radius of the curve is kept as small as possible, so that the functional section only supports the vertical chain link in a small area. In addition, it is preferably provided that, in the immediate vicinity of this area, the tangent of the rounding is so steep that there is no self-locking in the unkinking direction between the rounding of the horizontal chain link and the vertical chain link.

It can also be provided that the functional section successively tapers more strongly towards its distal end along its first direction. In this way, threading the functional section into the inner width of the vertical chain link is assisted.

It can furthermore be provided that the support path is arranged relative to the inner support section in the leg longitudinal extension direction of the horizontal chain link in such a way that the vertical chain link is supported tilted around its pitch axis in every position. The support path is then offset in the direction of the bow, starting from the support section. This improves the support contact between the horizontal chain link and the vertical chain link.

It can thus be provided that the cross section of the vertical chain link describes a convex contour facing inwards, so that the cross section has a smaller width than the inner width of the vertical chain link. The contour is preferably rounded.

The proposed unkinking geometry allows the functional section to be freely designed in a direction pointing away from the leg. In this way, the functional section can protrude beyond the width of the leg in its blocking plane. It is also possible for the functional section to essentially be aligned with the leg in the width direction. It can also be provided that the horizontal chain link essentially has a rectangular contour in a top view (a view of the plane spanned by the width and pitch). The bows can also be slightly rounded.

Typically, the blocking plane of the functional section is essentially transverse to the width of the functional section. However, the angle between the blocking plane and the direction of the width by which the vertical chain link has to be pivoted to unkink can also be smaller, approximately 70° to 80° for example. It is preferably provided that the blocking plane is spanned in the width-division direction of the horizontal chain link.

It is preferably provided that the horizontal chain link has corresponding functional sections on both sides of its bow, each of which has at least one, preferably two, corresponding support paths. It is furthermore preferably provided that the horizontal chain link is designed symmetrically with respect to its center point or in any case axially symmetrical with respect to its width axis. Then both bows have functional sections.

It is also preferably provided that the vertical chain link is designed symmetrically with respect to its center or at least with respect to its width axis.

The unkinking geometry allows a horizontal chain link to be provided, which is in any case completely rounded in the outward-facing area. A complete rounding is also possible towards the inside. This prevents dirt or conveyed material from getting stuck, so the chain wheel is protected.

Preferably, the horizontal chain link and the vertical chain link are produced from a steel material, for example by a forging process.

In addition to aspects and embodiments described above, further aspects and embodiments will become apparent by reference to the drawings, wherein like reference numerals generally designate corresponding structures in the several views.

BRIEF DESCRIPTION OF THE DRAWINGS

The below descriptions are provided with reference to the figures, wherein.

Figure 1:
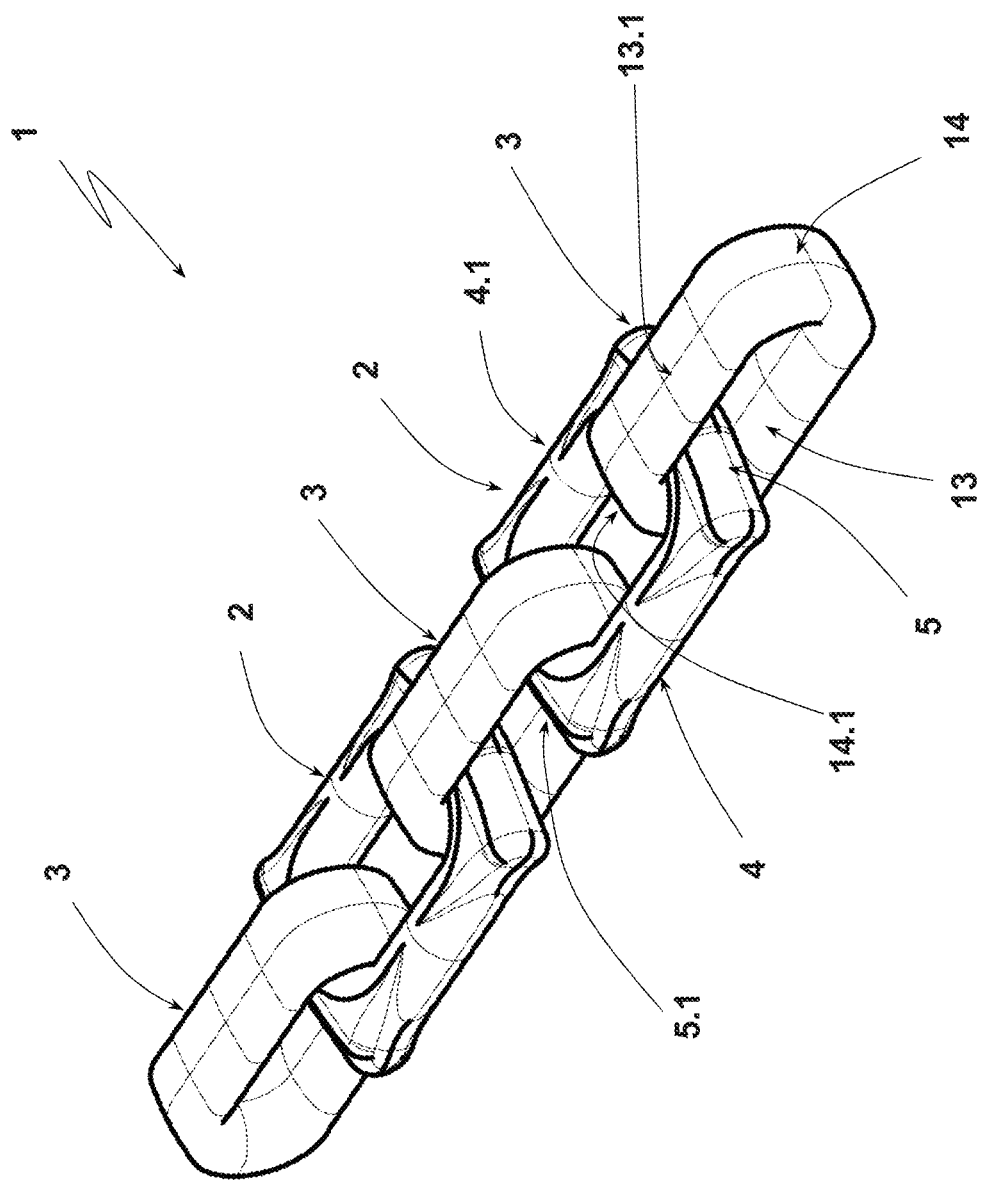
FIG. 1 shows a perspective view of an example chain according to the disclosure.

It is to be understood that the invention is not limited in application to the details of particular arrangements shown in the drawings, since the invention is capable of other embodiments. Embodiments and figures disclosed herein are to be considered illustrative rather than limiting.

DETAILED DESCRIPTION

FIG. 1 shows a chain 1 formed by interlocking horizontal chain links 2 and vertical chain links 3, produced by a forging process, in their intended arrangement—the pulling arrangement. In the view of FIG. 1, the horizontal chain links 2 are arranged in the horizontal plane, the vertical chain links 3 in the vertical plane. In this example embodiment, the chain 1 is guided in this way aligned with the chain wheel. The chain wheel has pockets into which the horizontal chain links 2 are inserted and by which a tensile force is applied to the chain 1.

The horizontal chain links 2 have opposite legs 4, 4.1 and bows 5, 5.1 connecting the legs 4, 4.1 to one another. In this way, each horizontal chain link 2 provides a self-contained body which follows a corresponding course 6. The course 6 is shown in dashed lines in FIG. 3. It extends essentially along the central fiber of the horizontal chain link 2. To initiate the tensile force, the chain wheel acts on the outside of the bow 5 with a compressive force.

Referring to FIGS. 2 to 5, the inner width 7 is to be understood as the distance of the two legs 4, 4.1 from one another and the outer width 8 is to be understood as the outer distance of the two legs 4, 4.1 from one another; the width direction 9 thus points in the distance direction of the legs 4, 4.1. The inner distance between the two bows 5, 5.1 points in the direction of the leg longitudinal extension 10; this inner distance is referred to as the pitch 11. The thickness of the horizontal chain link 2 is referred to as the height direction 12.

The vertical chain link 3 also has two opposite legs 13, 13.1, which are connected to one another by bows 14, 14.1, so that it also provides a closed course that engages in the course 6 of the horizontal chain link 2. The above designations regarding the horizontal chain link 2 (distances and directions) apply equally to the vertical chain link 3.

Figure 6:
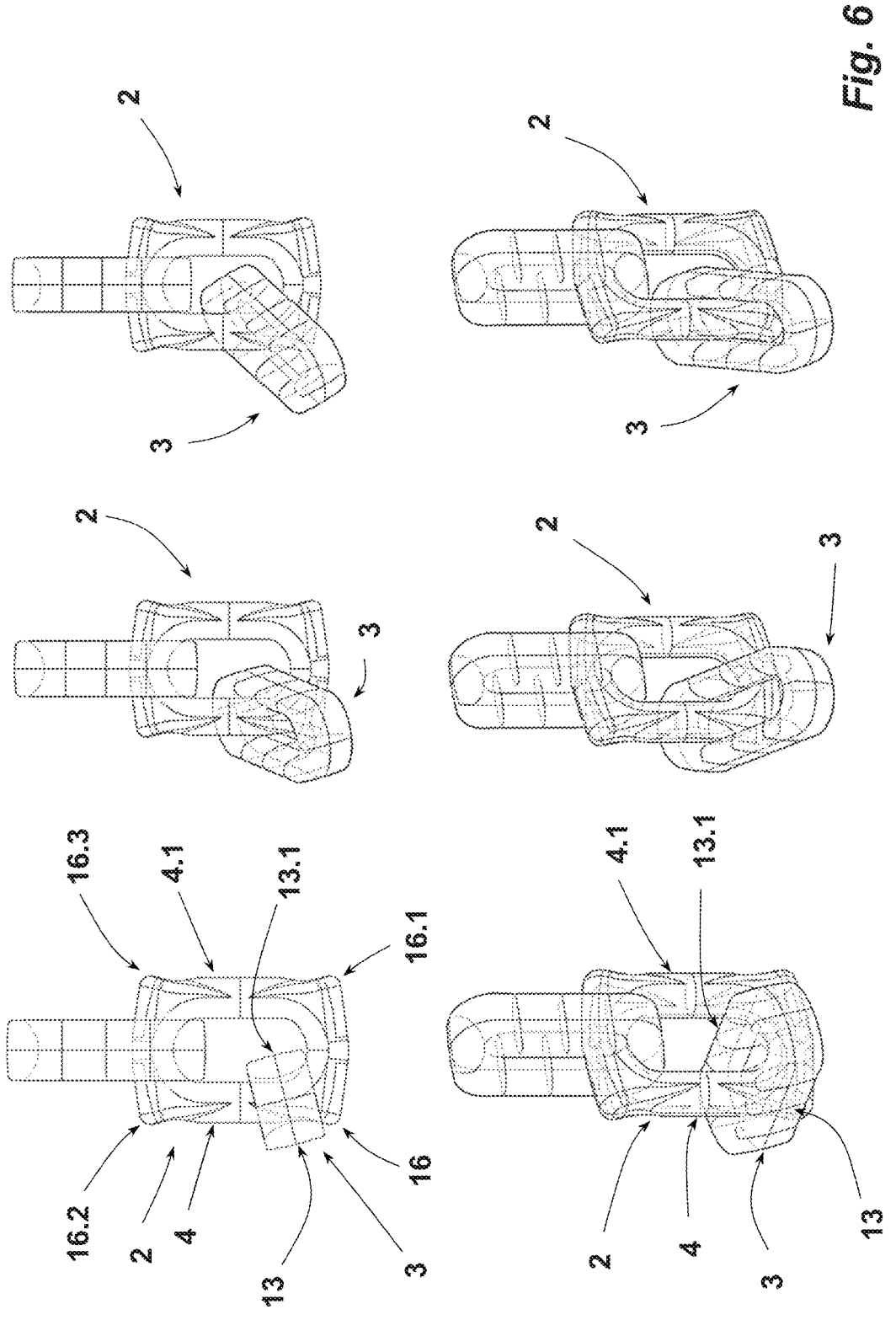

An unintended arrangement of the vertical chain link 3 to the horizontal chain link 2 is the kink arrangement: The vertical chain link 3 shown in FIG. 6 is kinked because it is plunged into the horizontal chain link 2 in the pitch axis 11.1 direction and with its legs 13, 13.1 encloses the legs 4, 4.1 of the horizontal chain link 2. From this arrangement, the vertical chain link 3 cannot easily return to its intended arrangement—the pulling arrangement—since the horizontal chain link 2 has four outward-facing functional sections 16, 16.1, 16.2, 16.3 which thicken the bows 5, 5.1. Reference is made below to the functional section designated by reference number 16 in the figures; the other functional sections 16.1, 16.2, 16.3 are identical and therefore the statements regarding section 16 apply equally to these other sections.

Reference is made below to the functional section designated by reference number 16 in the figures; the other functional sections 16.1, 16.2, 16.3 are identical and therefore the statements regarding section 16 apply equally to these other sections.

The functional section 16 is larger in a blocking plane 17 (shown as vectors in FIG. 4; the blocking plane 17 is parallel to the plane of FIG. 4) than the inner width of the vertical chain link 3. The vertical chain link 3 cannot go around the bow 5 in the position shown in FIG. 6 in the first step.

However, the functional section 16 has a width 18 which is narrower than the inner width of the vertical chain link 3. It is therefore understood that, as indicated in FIG. 6 in the sequence of the individual steps, rotating the vertical chain link 3 around the course 6 of the horizontal chain link 2 causes the vertical chain link 3 to be aligned relative to the functional section 16, or with respect to the blocking plane 17 and the width 18 of the functional section 16, in such a way that the functional section 16 can plunge through the vertical chain link 3. For this purpose, the pitch of the vertical chain link 3 essentially points in the direction of the blocking plane 17. In this way, the vertical chain link 3 can reach its pulling arrangement with respect to the horizontal chain link 2.

The functional section 16 is designed in its area facing toward the leg 4 in such a way that the required rotation of the vertical chain link 3 around the course 6 of the horizontal chain link 2 is carried out automatically under load. In FIG. 6, in the first step, the vertical chain link 3 is supported in a support section 19 on the bow 5 of the horizontal chain link 2 on the one hand, and on the other hand on the area of the functional section 16 facing toward the leg 4 as a nose 20. The vertical chain link 3 is supported here on a support path 21 (in the figures, the support paths 21 are only shown on selected functional sections 16, 16.1 for clarity, although these are equally provided for all functional sections 16, 16.1, 16.2, 16.3). Taking into consideration the design of the inward-facing part of the vertical chain link 3, the nose 20 is designed in such a way that it provides a support path 21 which leads around the course 6 of the horizontal chain link 2 and is inclined starting from the nose 20 in the direction of rotation of the vertical chain link 3. The inclination in the support path direction is at least 90°+arctan (μ) plus a safety angle of 2-5° in relation to the leg longitudinal extension direction 10. By selecting this angle, the friction-related self-locking between the horizontal chain link 2 and vertical chain link 3 during rotation is overcome solely by the force pointing in the leg longitudinal extension direction 10, such as the weight force of the vertical chain link 3. An additional force acting from the outside on the vertical chain link 3 in the direction of rotation is therefore not necessary. The force required for the rotation of the vertical chain link 3 results from the attempt of the vertical chain link 3 to follow the inclined support path 21 and to slide down along it in combination with a support on the inside with respect to the horizontal chain link 2 in the leg area on the horizontal chain link side.

Figures 2, 3:
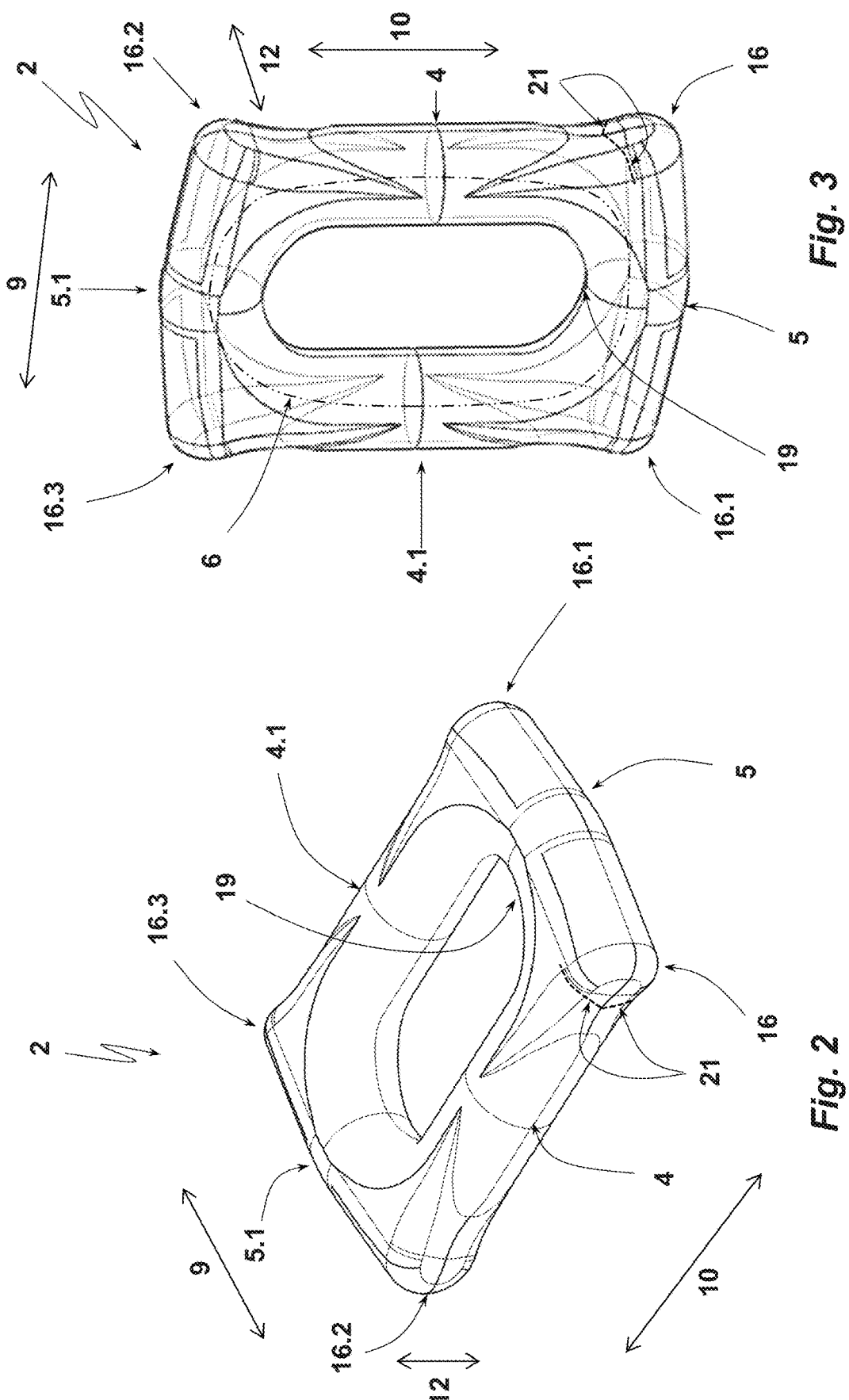
FIGS. 2 to 5 show various views of a horizontal chain link of the chain shown in FIG. 1, and FIGS. 6 and 7 show views during the unkinking process of the vertical chain link around the horizontal chain link of the chain shown in FIG. 1 in various views.

The support path 21 is shown in FIGS. 2 and 3 with respect to the horizontal chain link 2. It is largely determined by the geometry of the functional section 16 or the nose 20; however, the geometry of the vertical chain link 3 in its inward-facing part is of course adapted thereto, so that the functionality described above is ensured.

Figures 4, 5:
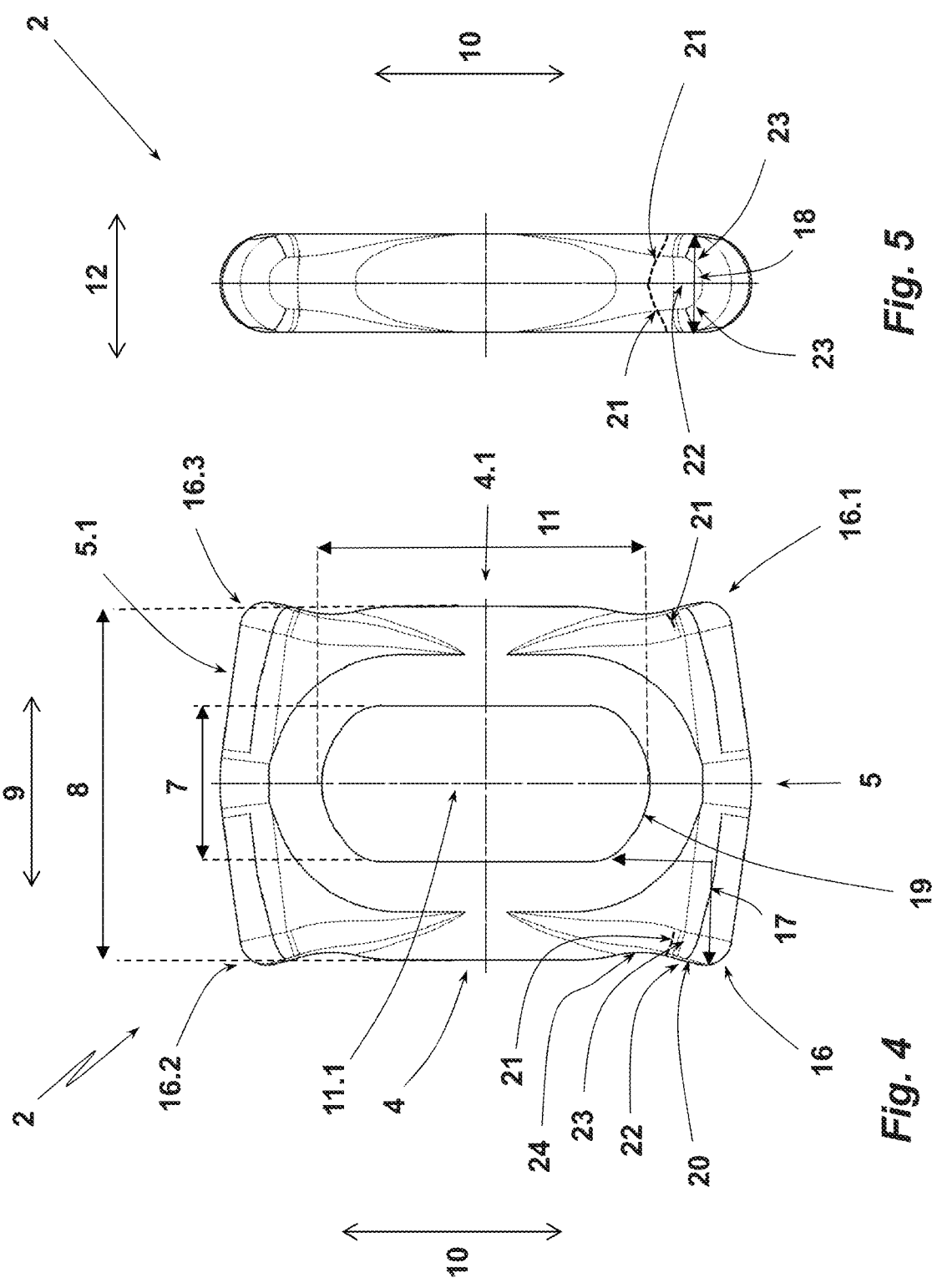

The functional section 16, or the nose 20, is designed in this example embodiment so that the nose bridge 22 of the nose 20 lies in the blocking plane 17 of the functional section 16; in this case the equator line of the horizontal chain link 2 is also in this plane. Starting from the nose bridge 22, nose wings 23 are formed which extend symmetrically along the nose bridge 22 in the height direction 12. The nose wings 23 are, as can be seen in FIG. 5, essentially flat in a first section starting from the nose bridge 22 and then merge into a radius until they are incorporated into the area of the horizontal chain link 2 that extends in the width and leg longitudinal extension directions 9, 10.

To form a nose base 24, a concave recessed area of the horizontal chain link 2 is provided in the transition from the leg 4 to the bow 5. This recessed area adjoins the nose wings 23 and is also correspondingly continuously formed with the area of the nose wings 23 that has the radius.

Figure 7:
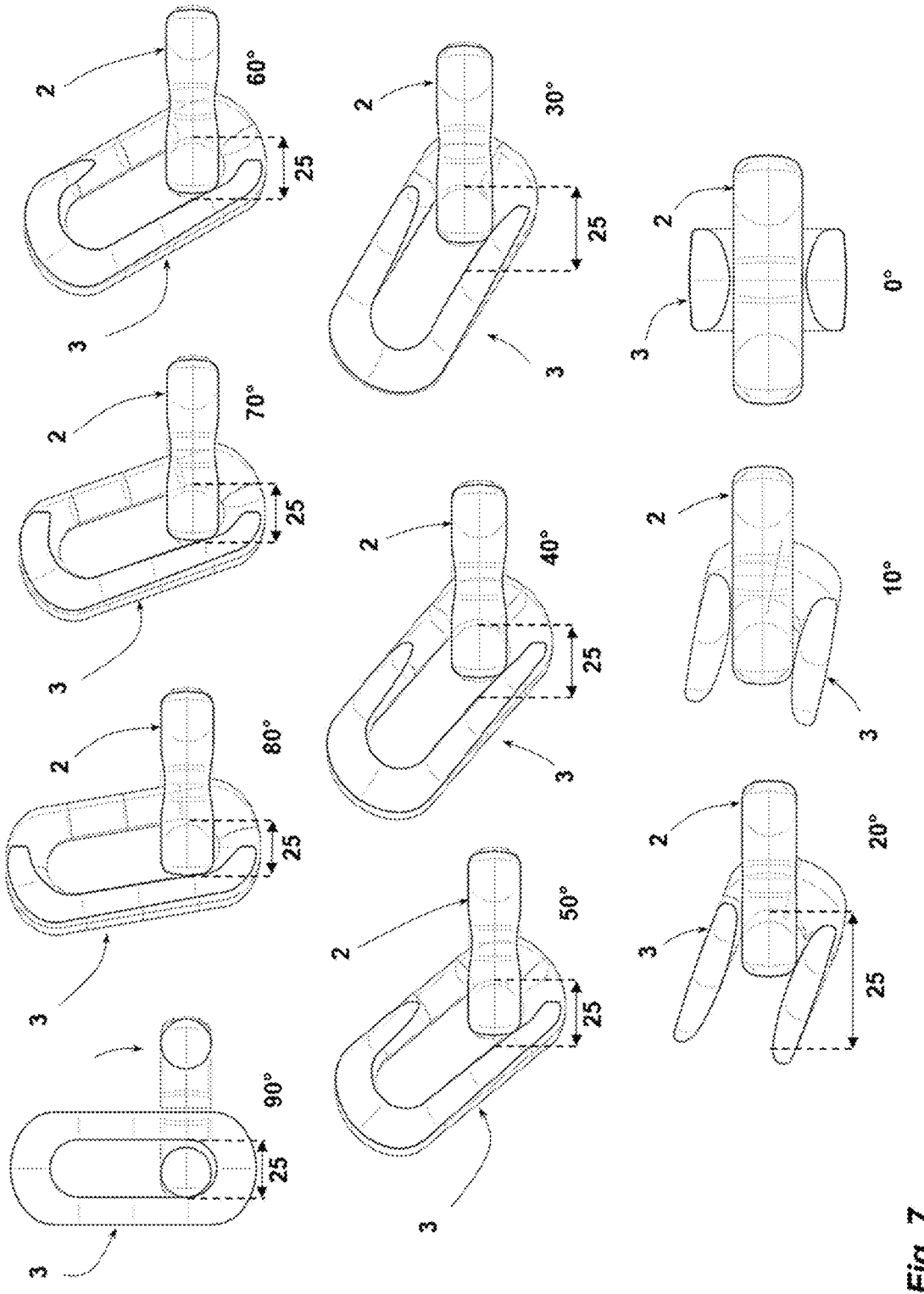

The rotation of the vertical chain link 3 around the course 6 of the horizontal chain link 2 is multi-axis and complex, since a movement around one axis due to the interlocking of the two chain links 2, 3 influences the movement or the degrees of freedom of another axis. This becomes clear in FIGS. 6 and 7, which show the various stages of unkinking. FIG. 7 shows various views from the outside of the bow 5 of the vertical chain link 3 in the leg longitudinal extension direction 10, wherein a sectional plane is placed in each case at the point at which the vertical chain link 3 and the horizontal chain link 2 contact one another on the outside support path 21.

It is particularly clear in FIG. 7 that by rotating the vertical chain link 3 around the course 6 of the horizontal chain link 2, the available width 25 increases continuously in the direction of the extension of the blocking plane 17 of the functional section 16, namely starting from the inner width of the vertical chain link 3 up to the pitch of the vertical chain link 3.

During the winding down of the vertical chain link 3 along the course 6 of the horizontal chain link 2, the effective support distance, i.e., the ratio between the support distance (distance from the support section 19 to the support path 21) and the available width 25 of the vertical chain link 3 in the blocking plane 17 of the functional section 16, becomes gradually smaller during the rotation. In this way, instability of the vertical chain link 3 relative to the horizontal chain link 2 is always introduced, so that a small further rotational movement is energetically more favorable for the vertical chain link 3. This ensures independent self-unkinking.

In order to provide the required support along the support path 21 over the widest possible angle of rotation, it is provided that the nose wings 23 also protrude outwards, for example starting from the median perpendicular, at a 30-50° angle relative to the nose base 24, or the recessed area, in order to ensure support.

In FIGS. 6 and 7, it can be seen that the vertical chain link 3 is successively guided over the functional section 16: initially it is supported thereby, or the nose 20, on the support path 21. It is understood that from a certain angle of rotation, the support by the support path 21 leading around the course 6 of the horizontal link becomes less, since in the height direction 12 of the horizontal chain link 2 there may not be any material that is wider than the inner width of the vertical chain link 3. As soon as this specific, critical angle of rotation is reached, the vertical chain link 3 pitches downward, is supported by the guide surface provided by the nose wing 23, and is guided around the functional section 16. The angle of rotation is approximately 40° in this example (see FIG. 7).

The vertical chain link 3 is made from a shaped steel, which is convex and rounded in an inwardly facing direction. The rounding takes place to such an extent that it initially has a small radius along the height direction of the vertical chain link 3, starting from the lateral surface pointing in the height direction, then a larger radius until a smaller radius is provided again in the area of the equator line, so that the thickest point of the vertical chain link 3 is provided at the equator line. The opposite geometry with respect to the equator line is symmetrical.

It is provided that the horizontal chain link 2 is designed to be rounded overall, so that the vertical chain link 3 can always slide off the horizontal chain link 2 from a kink arrangement into a pulling arrangement. In this way, a self-unkinking chain 1 is provided.

The invention has been described on the basis of one or more example embodiments. Without departing the scope of the claims, numerous further embodiments and options for implementing the invention are apparent those skilled in the art, without these having to be explained or shown in greater detail in the context of this disclosure.

While several aspects and embodiments have been discussed herein, those persons skilled in the art will recognize numerous possible modifications, permutations, additions, combinations and sub-combinations therefor, without these needing to be specifically explained or shown within the context of this disclosure. The claims should therefore be interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown or described, or portions thereof, but it is recognized that various modifications are possible within the scope of the invention. Thus, it should be understood that although the invention has been specifically disclosed by preferred embodiments and optional features, modification and variation of the concepts herein may be resorted to by those skilled in the art, and that such modifications and variations are considered to be within the scope of this invention as defined by the claims. Whenever a range is given in the specification, all intermediate ranges and subranges, as well as all individual values included in the ranges given are hereby incorporated into this disclosure. When a Markush group or other grouping is used herein, all individual members of the group and all combinations and sub-combinations possible of the group are hereby individually included in this disclosure. In general, the terms and phrases used herein have their art-recognized meaning, which can be found by reference to standard texts, references and contexts known to those skilled in the art. Any above definitions are provided to clarify their specific use in the context of the invention.

LIST OF REFERENCE NUMERALS

1 chain
2 horizontal chain link
3 vertical chain link
4, 4.1 leg of the horizontal chain link
5, 5.1 bow of the horizontal chain link
6 course of the horizontal chain link
7 inner width of the horizontal chain link
8 outer width of the horizontal chain link
9 width direction of the horizontal chain link
10 leg longitudinal extension direction of the horizontal chain link
11 pitch of the horizontal chain link
12 height direction of the horizontal chain link
13, 13.1 leg of the vertical chain link

14, 14.1 bow of the vertical chain link
16, 16.1, 16.2, 16.3 functional section
17 blocking plane of the functional section
18 width of the functional section
19 support section
20 nose
21 support path
22 nose bridge
23 nose wings
24 nose base
25 available width of the vertical link

The invention claimed is:

1. A chain comprising:

a horizontal chain link and a vertical chain link linked in the horizontal chain link, the chain links each having two legs and two opposite bows connecting the legs to one another, such that the chain links each form self-contained courses, wherein the horizontal chain link has a functional section on at least one bow, wherein the functional section is configured in a blocking plane such that the functional section cannot plunge through the vertical chain link in a kink arrangement arranged in a first orientation relative to the horizontal chain link, and wherein the functional section has a width that is narrower than an inner width of the vertical chain link such that that functional section can plunge through the vertical chain link arranged in a second orientation relative to the horizontal chain link into a pulling arrangement, wherein the horizontal chain link has an inner support section in an inward-facing apex region of each bow and, on the functional section, the horizontal chain link provides an outer support path leading around the course of the horizontal chain link for supporting the vertical chain link, along which support path the vertical chain link can slide at least in sections from the kink arrangement by rotating around the course of the horizontal chain link into the pulling arrangement, and which support path is inclined in a support path direction by at least 90°+arctan (μ) in relation to a leg longitudinal extension direction starting from the functional section, where μ is the coefficient of friction of the two chain links in an area of the support path, such that the vertical chain link independently rotates away from the kink arrangement around the horizontal chain link so that the vertical chain link aligns with a direction of the inner width of the vertical chain link parallel to a direction of the width of the functional section, whereby the functional section plunges through the vertical chain link and the vertical chain link reaches the pulling arrangement.

2. The chain of claim 1, wherein at least one guide surface for supporting the vertical chain link is provided on the functional section, which guide surface opens in the kink arrangement within the inner width of the vertical chain link and guides the vertical chain link in a height direction of the horizontal chain link, such that the vertical chain link slides from the kink arrangement by rotating around the course of the horizontal chain link into the pulling arrangement, and which guide surface is inclined in a guide direction by at least 90°+arctan (μ) in relation to the leg longitudinal extension direction starting from the functional section, where μ is the coefficient of friction of the two chain links in an area of the guide surface, such that the vertical chain link automatically rotates from the kink arrangement around the horizontal chain link so that the direction of the inner width of the vertical chain link is aligned parallel to the direction of the width of the functional section and thus reaches the pulling arrangement.

3. The chain of claim 1, wherein the blocking plane of the functional section extends in a width direction of the horizontal chain link.

4. The chain of claim 1, wherein the width of the functional section, whereby the functional section can plunge through the vertical chain link, points transversely to the blocking plane.

5. The chain of claim 1, wherein the support path is a kink-free track.

6. The chain of claim 1, wherein the functional section is configured as a nose comprising a nose bridge in the blocking plane of the functional section and, starting from the nose bridge, two support paths are guided along nose wings on both sides around the course of the horizontal chain link.

7. The chain of claim 1, wherein the functional section is configured to successively taper more strongly towards a distal end thereof along the blocking plane.

8. The chain of claim 1, wherein the support path is arranged relative to the inner support section in the leg longitudinal extension direction of the horizontal chain link such that the vertical chain link is supported tilted around a pitch axis of the horizontal chain link.

9. The chain of claim 1, wherein, in forming the support path, the horizontal chain link is concavely set back in cross section relative to an outer width of the legs.

10. The chain of claim 1, wherein the vertical chain link has a convex contour facing inwards in cross section.

11. The chain of claim 1, wherein the functional section protrudes in the blocking plane beyond an outer width of the legs in a width direction of the horizontal chain link.

12. The chain of claim 1, wherein the at least one bow of the horizontal chain link has, on both sides thereof, corresponding functional sections which both have support paths.

13. The chain of claim 1, wherein the horizontal chain link is configured to be completely rounded at least in an area thereof facing outwards.

* * * * *